United States Patent
Ko et al.

(10) Patent No.: US 10,620,167 B1
(45) Date of Patent: Apr. 14, 2020

(54) IN-PLANE MODULUS TESTING OF MATERIALS BY AN ULTRASONIC DRY-CONTACT METHOD

(71) Applicant: Government of the United States, as Represented by the Secretary of the Air Force, Wright-Patterson AFB, OH (US)

(72) Inventors: Ray T. Ko, Dublin, OH (US); Ming-Yung Chen, Beavercreek, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 224 days.

(21) Appl. No.: 15/876,243

(22) Filed: Jan. 22, 2018

Related U.S. Application Data

(60) Provisional application No. 62/449,667, filed on Jan. 24, 2017.

(51) Int. Cl.
    *G01N 29/04*      (2006.01)
    *G01N 29/28*      (2006.01)

(52) U.S. Cl.
    CPC ............ *G01N 29/28* (2013.01); *G01N 29/04* (2013.01); *G01N 2291/102* (2013.01)

(58) Field of Classification Search
    CPC ... G01N 29/28; G01N 29/04; G01N 2291/102
    USPC .......................................................... 73/644
    See application file for complete search history.

(56) References Cited

U.S. PATENT DOCUMENTS

| | | | | |
|---|---|---|---|---|
| 3,477,278 A | * | 11/1969 | Lynnworth | G10K 15/00 73/64.53 |
| 4,559,827 A | * | 12/1985 | Kupperman | G01N 29/28 73/644 |
| 4,868,357 A | * | 9/1989 | Serikawa | H05B 6/6411 219/706 |

(Continued)

OTHER PUBLICATIONS

Chen, M., Rapid Development and Insertion of Hypersonic Materials, Jan. 26, 2012.

(Continued)

*Primary Examiner* — Jacques M Saint Surin
(74) *Attorney, Agent, or Firm* — AFMCLO/JAZ; Timothy M. Barlow

(57) ABSTRACT

An apparatus for performing nondestructive evaluation of a specimen comprises a first ultrasonic longitudinal wave transducer configured to be coupled to a first edge of a specimen to be tested; a second ultrasonic longitudinal wave transducer configured to be coupled to the first side of the specimen at a predetermined distance from the first ultrasonic shear wave transducer, wherein the first ultrasonic longitudinal wave transducer is configured to transmit a guided wave into the specimen, and the second ultrasonic longitudinal wave transducer is configured to receive the guided wave from the first ultrasonic longitudinal wave transducer. The first ultrasonic longitudinal wave transducer and the second ultrasonic longitudinal wave transducer are low frequency longitudinal transducers that are capable of operating at or below 0.5 MHz (500 KHz). A membrane may be used as the couplant between the transducers and the specimen.

11 Claims, 13 Drawing Sheets

(56) References Cited

U.S. PATENT DOCUMENTS

| | | | | |
|---|---|---|---|---|
| 5,406,851 A | * | 4/1995 | Li | G01N 29/2487 |
| | | | | 73/644 |
| 5,494,038 A | * | 2/1996 | Wang | A61B 8/0866 |
| | | | | 600/459 |
| 5,663,502 A | * | 9/1997 | Nagashima | G01B 17/025 |
| | | | | 702/171 |
| 5,691,476 A | * | 11/1997 | Madaras | A61B 8/4281 |
| | | | | 73/625 |
| 5,770,801 A | * | 6/1998 | Wang | A61B 8/0866 |
| | | | | 604/892.1 |
| 2003/0221489 A1 | * | 12/2003 | Koo | G01H 5/00 |
| | | | | 73/597 |
| 2007/0144263 A1 | * | 6/2007 | Fei | G01N 29/043 |
| | | | | 73/644 |
| 2009/0217763 A1 | | 9/2009 | Yamano | |
| 2013/0030727 A1 | * | 1/2013 | Zalameda | G01N 29/045 |
| | | | | 702/56 |
| 2015/0053013 A1 | * | 2/2015 | Baarstad | G01N 29/26 |
| | | | | 73/620 |
| 2015/0059479 A1 | * | 3/2015 | Davis | G01N 29/28 |
| | | | | 73/644 |

OTHER PUBLICATIONS

Frangopol, D., Life-Cycle Reliability-Based Optimization of Civil and Aerospace Structures, Computeres and Structures, 81, 2003, 397-410.

Greenhalgh, E.,The Assessment of Novel materials and Processes for the Impact Tolerant Design of Stiffened Composite Aerospace Structures, Composites: part A, 34, 2003,151-161.

Standard Practice for Measuring Ultrasonic Velocity in Materials, E494-15, Dec. 2015, 1-14.

Ko, R., Ultrasonic Measurements of Vlocity for Modulus Assessment of a Material Using a Delay Line Approach, 39th Annual Review of Progress in Quantitative Nondestructive Eval.

Hoppe, W., Navy High-Strength Steel Corrosion-Fatigue Modeling Program, Oct. 2006.

Boehnlein, T., Research on Advanced Nondestructive Evaluation (NDE) Methods for Aerospace Structures, Mar. 2004.

* cited by examiner

IN-PLANE MODULUS TESTING OF MATERIALS BY AN ULTRASONIC DRY-CONTACT METHOD

Pursuant to 37 C.F.R. § 1.78(a)(4), this application claims the benefit of and priority to prior filed Provisional Application Ser. No. 62/449,667, filed Jan. 24, 2017, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to non-destructive evaluation of materials and, more particularly, to ultrasonic testing methods.

BACKGROUND OF THE INVENTION

Known in-plane modulus tests are typically conducted by a mechanical test which results in the destruction of the specimen. The difficulty in controlling couplant contamination on specimens and the lack of a practical dry contact ultrasonic technique limits the usefulness of known nondestructive tests of specimens, e.g. composites. Currently, most in-plane modulus testing of composites is conducted mechanically with a tensile test machine. To prepare for a mechanical test, a tensile test specimen is cut from the composite panel. Extensometers or strain gauges are installed on the specimen for a strain measurement. In addition, a stress measurement is also needed for the in-plane modulus evaluation by mechanical means. Accordingly, specimens tested by the mechanical method are no longer reusable for further material processing. In addition, the time required to perform in-plane modulus testing is relatively long.

Current state-of-the-art approaches often require immersion of the specimen into a water tank, although water immersion is not preferred and testing high-performance composites like ceramic composite materials (CMC) and metals during an ultrasonic measurement at elevated temperature. To achieve a couplant-free condition for an ultrasonic test, advanced tools such as lasers, electromagnetic acoustic transducers, and air coupled sensors have been reported, but poor sensitivity in ultrasonic signals and limitations to certain types of materials are typical drawbacks of these advanced methods. Current dry couplant materials which is available commercially does not provide sufficient sensitivity in transmitting ultrasound. No nondestructive evaluation (NDE) analysis can be performed using this material.

SUMMARY OF THE INVENTION

The present invention overcomes the foregoing problems and other shortcomings, drawbacks, and challenges of non-destructive testing of materials. While the invention will be described in connection with certain embodiments, it will be understood that the invention is not limited to these embodiments. To the contrary, this invention includes all alternatives, modifications, and equivalents as may be included within the spirit and scope of the present invention.

According to a first embodiment of the invention, an apparatus for performing nondestructive evaluation of a specimen comprises: a first ultrasonic longitudinal wave transducer configured to be coupled to a first contact point of a specimen to be tested; a second ultrasonic longitudinal wave transducer configured to be coupled to a second contact point of the specimen at predetermined distance from the first contact point, wherein the first ultrasonic longitudinal wave transducer is configured to transmit a guided wave into the specimen, and the second ultrasonic longitudinal wave transducer is configured to receive the guided wave from the first ultrasonic longitudinal wave transducer; and a delay line between at least one of the first ultrasonic longitudinal wave transducer and the first contact point and the second ultrasonic longitudinal wave transducer and the second contact point.

This arrangement provides particular advantages, including that the specimen to be tested or measured may be placed into an oven for testing. This permits the material to be tested at a particular temperature, and also eliminates the possibility of contamination of the specimen with a liquid couplant.

According to another embodiment of the invention, the first ultrasonic longitudinal wave transducer and the second ultrasonic longitudinal wave transducer are low frequency longitudinal transducers that are capable of operating at or below 0.5 MHz (500 kHz).

According to a further embodiment of the invention, the apparatus for performing nondestructive evaluation of a specimen further comprises a dry couplant between the first and second ultrasonic longitudinal wave transducers and the specimen.

According to another embodiment of the invention, the dry couplant comprises a membrane between the first and second ultrasonic longitudinal wave transducers and the specimen.

Ultrasonic signals may be passed into a specimen without any liquid ultrasonic couplant. This provides an advantage over traditional ultrasonic bulk waves or guided-wave measurements which usually require ultrasonic gel or water immersion; the dry contact ultrasonic approach reduces or eliminates the risk of contaminating the materials, which may happen during immersion or with a liquid couplant. The dry couplant also makes it possible to operate the ultrasonic longitudinal wave transducers in a low frequency range, e.g. at or below 0.5 MHz (at or below 500 kHz).

This arrangement may ensure that the modulus measurement stays in the low frequency asymptote region of the lowest symmetric mode for an in-plane modulus evaluation on a thin specimen. The use of a longitudinal wave contact method on the edge of a thin specimen may induce the lowest symmetric mode of a Lamb wave, which makes it possible to perform nondestructive evaluation of specimens.

According to another embodiment of the invention, the dry couplant is a polymer membrane, such as a nitrile, vinyl, or polyester membrane, which provide high sensitivity in transmitting ultrasound.

According to a further embodiment of the invention an apparatus for performing nondestructive evaluation of a specimen comprises: a first ultrasonic longitudinal wave transducer couplable to a first contact point of a specimen to be tested; a second ultrasonic longitudinal wave transducer couplable to a second contact point of the specimen at a predetermined distance from the first contact point, wherein the first ultrasonic longitudinal wave transducer is configured to transmit a wave into the specimen, and the second ultrasonic longitudinal wave transducer is configured to receive the wave from the first ultrasonic longitudinal wave transducer; and a dry couplant between at least one of the first ultrasonic longitudinal wave transducer and the first contact point and the second ultrasonic longitudinal wave transducer and the second contact point.

This arrangement provides particular advantages, including that the specimen to be tested or measured may be placed into an oven for testing. This permits the material to be tested at a particular temperature, and also eliminates the possibility of contamination of the specimen with a liquid couplant.

According to another embodiment of the invention, the dry couplant comprises a membrane between the first and second ultrasonic longitudinal wave transducers and the specimen.

According to a further embodiment of the invention, the dry couplant is a polymer membrane, which may be a nitrile rubber, vinyl, or polyester membrane.

Ultrasonic waves may be passed into a specimen without any liquid ultrasonic couplant. This provides an advantage over traditional ultrasonic bulk waves or guided-wave measurements which usually require ultrasonic gel or water immersion; the dry contact ultrasonic approach reduces or eliminates the risk of contaminating the materials, which may happen during immersion or with a liquid couplant. The dry couplant also makes it possible to operate the ultrasonic longitudinal wave transducers in a low frequency range, e.g. at or below 0.5 MHz (at or below 500 kHz).

According to another embodiment of the invention, a method for performing nondestructive evaluation of a specimen comprises: coupling a first ultrasonic wave transducer to a first contact point of a specimen to be tested; coupling a second ultrasonic wave transducer to a second contact point of the specimen at the opposite edge from the first ultrasonic longitudinal wave transducer; transmitting a wave from the first ultrasonic wave transducer into the specimen; and receiving the wave by the second ultrasonic wave transducer, wherein the first ultrasonic wave transducer is configured to transmit a guided wave into the specimen, and the second ultrasonic wave transducer is configured to receive the guided wave from the first ultrasonic wave transducer; and inserting a delay line between at least one of the first ultrasonic wave transducer and the first contact point and the second ultrasonic wave transducer and the second contact point.

This arrangement provides particular advantages, including that the specimen to be tested or measured may be placed into an oven for testing. This permits the material to be tested at a particular temperature, and also eliminates the possibility of contamination of the specimen with a liquid couplant.

According to a further embodiment of the invention, the method for performing nondestructive evaluation of a specimen further comprises operating the first ultrasonic wave transducer and the second ultrasonic wave transducer at or below 0.5 MHz (500 kHz).

This arrangement may ensure that the modulus measurement stays in the low frequency asymptote region of the lowest symmetric mode for an in-plane modulus evaluation on a thin specimen. The use of a longitudinal wave contact method on the edge of a thin specimen may induce the lowest symmetric mode of a Lamb wave, which makes it possible to perform nondestructive evaluation of specimens.

According to another embodiment of the invention, the method for performing nondestructive evaluation of a specimen further comprises: inserting the specimen into an oven, wherein the first ultrasonic wave transducer and the second ultrasonic wave transducer are located outside the oven, and the delay lines couple the first ultrasonic wave transducer and the second ultrasonic wave transducer to the specimen.

This arrangement provides particular advantages, including that the specimen to be tested or measured may be placed into an oven for testing. This permits the material to be tested at a particular temperature, and also eliminates the possibility of contamination of the specimen with a liquid couplant.

Several points of novelty are presented in this invention including that the generation and reception of guided waves of a selected mode may be through the edge of the specimen. In addition, the dry-contact method provides high sensitivity without typical liquid or gel couplets which would contaminate the specimen and render it unsuitable for further testing or use. The method is capable of determining the ultrasonic velocity in materials even in the case in which only one echo is present and when the starting point of the echo is not well-defined. Further, the proper frequency range for velocity measurements can be related to the in-plane modulus of the material tested. For optimal results, the edges of the test specimen should be parallel.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
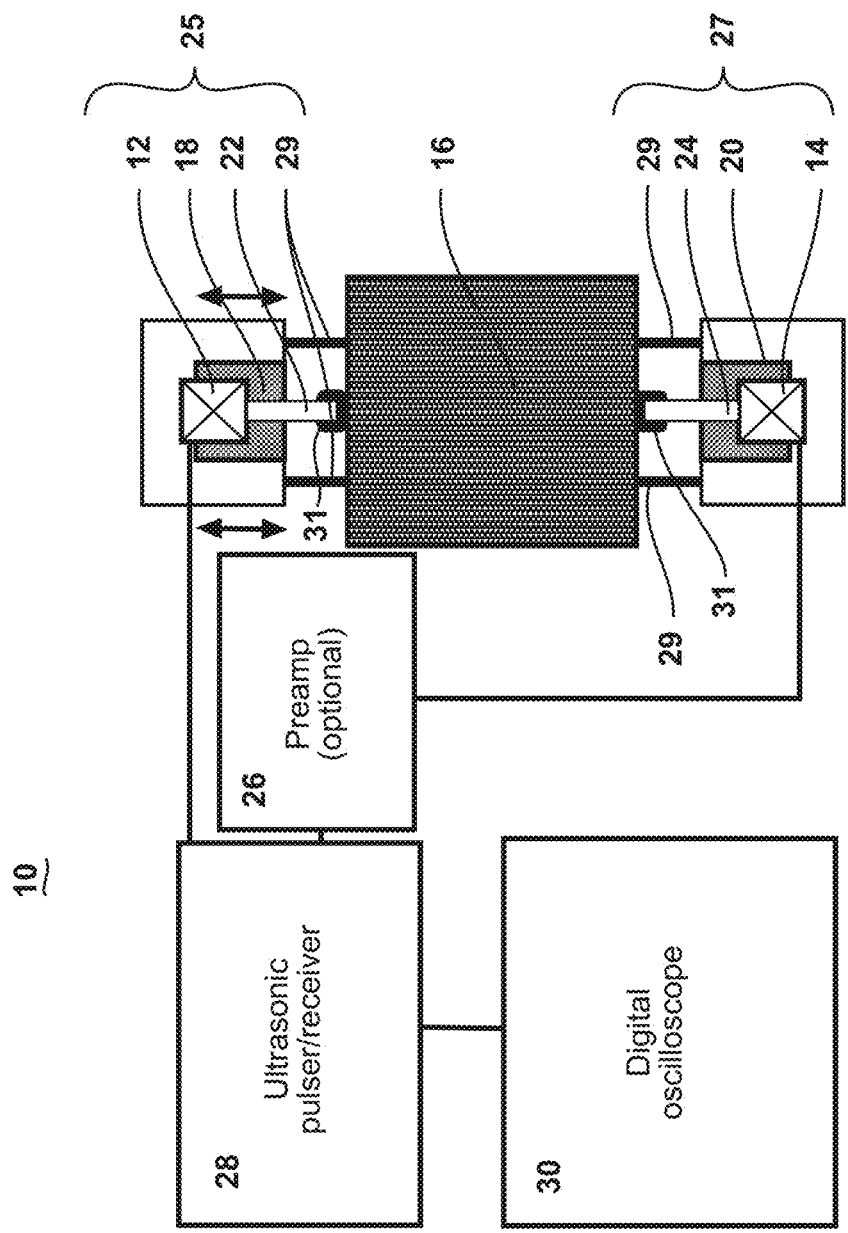
FIG. 1 depicts an apparatus for performing nondestructive evaluation of a specimen with ultrasound transducers in dry-contact (using one or more delay lines) with the specimen, according to the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The purpose of this invention is to provide an easy and versatile nondestructive apparatus and method to monitor the in-plane modulus (Young's modulus at the in-plane direction) of a specimen, e.g. a thin composite plate, using a dry contact low frequency ultrasonic guided wave approach, such as with a delay line between the transducers and the specimen.

In one embodiment of this invention, a small diameter delay line may be attached to a transducer through a custom-made delay line fixture for passing low frequency guided waves through the delay line and into a specimen, e.g. a thin composite. At least three advantages have been found so far using this new approach: (a) the thin delay line approach is robust and exhibits less wear and tear than with a membrane for dry contact; (b) this approach exhibits increased spatial resolution; and (c) delay line dry contact approach enables monitoring of the modulus at elevated temperatures, e.g. when the specimen is in an oven.

In addition, this invention has three areas which are unique as compared to the prior art: (i) it is based the lowest order symmetric mode ultrasonic guided waves; (ii) generation and detection of the guided waves is in dry contact; and (iii) the in-plane modulus of a material may be easily assessed based on the velocity of this mode.

Regarding (i) above, most ultrasonic guided wave processes on are focused on higher order modes in which many different modes co-exist. The great number of simultaneous modes make it difficult to monitor small changes in materials using these higher order modes. However, the lowest order mode such as is employed in this invention exists in a region where only few modes are present. Therefore, it is much easier to identify any changes and to monitor variations in materials using the lowest order mode. Furthermore, in this invention a non-dispersive region of the lowest mode was selected for the modulus assessment. Low frequency shear wave transducers, when they are on the same side of a specimen and their displacement/vibration direction are pointed toward each other, may produce a Lamb wave of the lowest symmetric mode. The term "symmetric" means the vibration of ultrasound is symmetric or mirrored with respect to a specimen. The term "lowest" is used because there are multiple higher modes at higher frequencies. This approach greatly reduces the need for using advanced tone burst equipment for a velocity measurement. Instead, a typical ultrasonic pulser/receiver may be used for a velocity measurement.

Regarding (ii) above, this invention also has the additional novelty of a dry-contact arrangement in the generation and detection of guided waves. Dry-contact may be made possible by using a delay-line, e.g. a waveguide, between one or both of the ultrasonic transducers and the specimen. Accordingly, ultrasound may be passed into a specimen without any typical, e.g. liquid or gel, ultrasonic couplant. This arrangement is quite distinct from the traditional processes and apparatuses for ultrasonic measurements using bulk waves or guided waves, which usually require ultrasonic gel or water immersion. The dry contact ultrasonic approach in this invention requires no ultrasonic couplant, i.e. no liquid, gel, or similar couplant, and thus reduces the risk of contaminating the materials.

Regarding (iii) above, based on this invention the in-plane modulus of a specimen may be monitored using this dry contact approach by monitoring the velocity of the guided ultrasonic wave generated in the specimen, e.g. composite plate. This in-plane modulus relates to material states in the specimen, and is often desirable at different stages of material processing including: raw materials, during processing, after manufacturing, in-between and after performance tests.

The inventive method and apparatus described herein is a dry contact ultrasonic approach based on low frequency guided wave technology. No traditional couplant is needed during a measurement. Thin composites with different amounts of porosity are able to be tested with the disclosed approach, and no couplant residue or contamination remains on the specimens after testing. Certain CMCs are not useful for many purposes if the porosity is found to be too high. Advantageously, the costs of modulus testing according to the disclosed approach are relatively low, and the time required for testing is short. This dry contact guided ultrasonic method may be used in testing materials at ambient temperatures as well as at elevated temperatures. Progress of densification or infiltration in composite specimens may also be monitored using this method. Composites with layers or gradients may also be measured. No similar methods and apparatuses are known.

Preparation of a modulus testing setup may comprise the following components: a pair of low frequency longitudinal wave ultrasonic transducers for the generation and detection of guided waves in a specimen, e.g. thin composite panel; a delay line attached to each transducer for contacting the specimen; an assembly which holds a transducer to its respective delay line; a fixture which holds the transducer assembly; an adjustable guide which includes two transducer assemblies with the ultrasonic sensing elements face-to-face to allow a specimen of nominal length to be inserted in between the transducer assemblies for an edge-to-edge inspection; an ultrasonic pulser-receiver for the generation and detection of ultrasound; a digital oscilloscope for acquisition of the ultrasonic waveform on the display of the oscilloscope.

In a representative setup 10 (see FIG. 1), a pair of 200 kHz, 0.5" diameter longitudinal transducers 12, 14 (Olympus™ V1116 for example) was applied to opposing edges of a CMC (ceramic matrix composite) composite panel 16, i.e.

test specimen using a custom fixture 18, 20, via metal or quartz delay lines 22, 24 of small diameters (0.2" or 0.08"). To maintain performance in the low frequency region, the product of the ultrasound frequency (in MHz) and the thickness of the composite (in mm) should be maintained around or less than 0.5 MHz*mm. The measurement may also be maintained in the principal direction of a composite (i.e., 0-deg or 90-deg or fiber direction of a cross-ply composite) in order to simplify calculations.

A membrane 31 may be placed across the surface of a transducer 12, 14 (see FIG. 2), between the specimen 16 and its delay line 22, 24. The membrane 31 may be a nitrile rubber membrane, e.g. a nitrile membrane such as may be found in nitrile gloves. On both ends of the delay line 22, 24, a thin layer of a viscous medium (e.g. honey or similar ultrasonic couplant) may be applied to enhance the transmission and reception of ultrasonic signals across the membrane 31. No liquid couplant is required between the specimen 16 and the delay lines 22, 24. The transducer assembly, which may comprise a transcoder 12, 14, delay line fixture 18, 20, and a delay line 22, 24, may be part of an additional fixture 25, 27 which can slide up and down for inspecting specimens 16 of different sizes. The specimen 16 may be held below this sliding fixture 25 which contains the transducer assembly. The fixture 25 may provide a small nominal weight on the specimen 16 in order to maintain positive contact. To optimize the transmission of ultrasound into the specimen, the specimen may be positioned between each delay line across its diameter.

As depicted in FIG. 1, the specimen 16 sits on a stationary bottom transducer assembly 27, while the top transducer assembly 25 may be mounted so as to slide up and down, e.g. along two guides 29 behind the specimen 16. If the diameter of a delay line or a transducer is larger than the thickness of the specimen, it is recommended to position the specimen between delay lines, while allowing the specimen 16 to sit across the diameter of each delay line for maximum transmission of ultrasound, regardless of whether one or two delay lines are used. By attaching delay lines of smaller diameters in front of transducers, it is possible to study individual layers in a multiple-layered specimen (i.e., graded composites). A broadband ultrasonic pulser/receiver 28 (Olympus™ 5072PR) may be used for the generation and reception of the ultrasonic signal. Amplification of the signal using a preamp 26 (Olympus™ ultrasonic preamp) is optional but not required. A digital oscilloscope 30 (e.g. Agilent 54622A, LeCroy 9350A or 24MXs-B) capable of acquiring waveforms may be used for the data acquisition of the ultrasonic waveform displayed on the oscilloscope. The benefit of using this setup is that it permits variations in the specimen 16 to be sensed and measured, e.g. if the specimen 16 has a gradient or multiple layers with different compositions.

Figure 2:
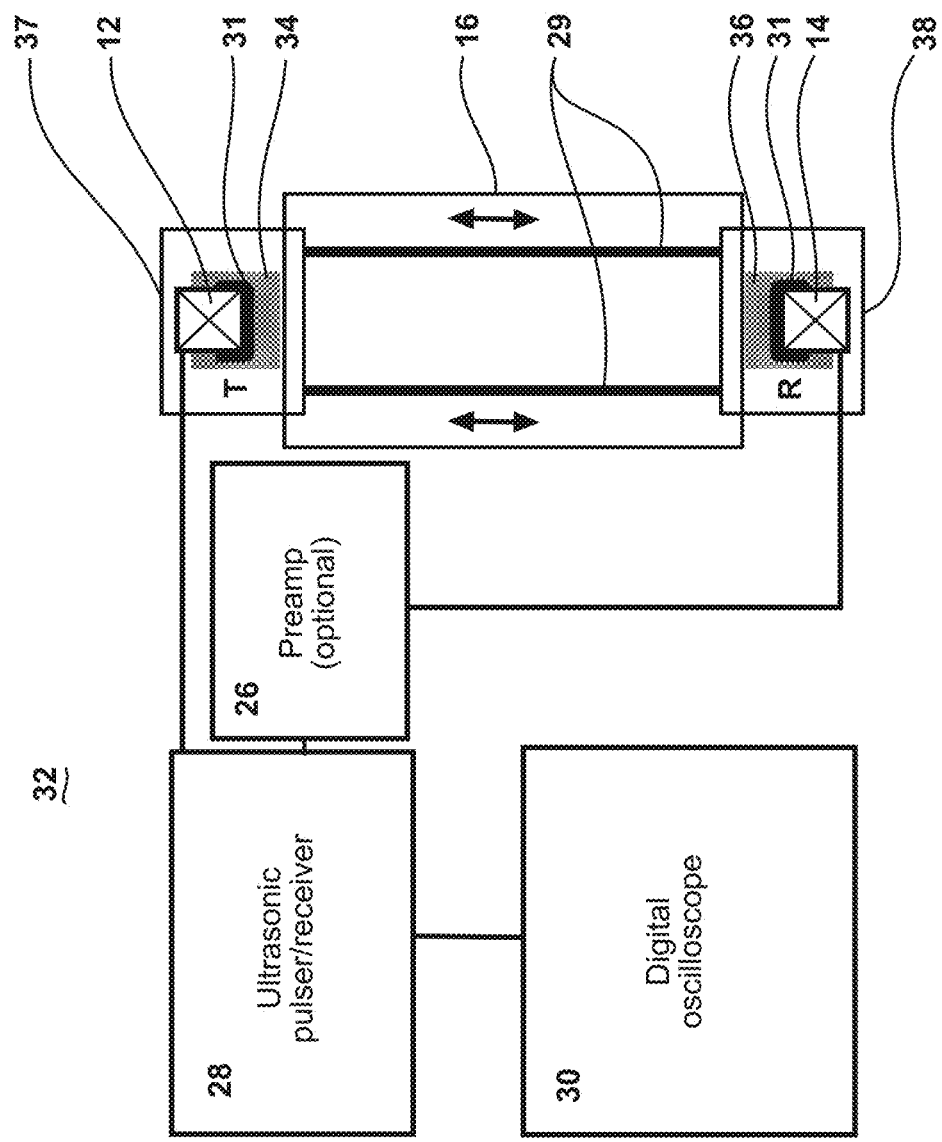
FIG. 2 depicts a specimen between a pair of dry-contact ultrasound transducers, according to the invention.

The embodiment of FIG. 2 employs a two-transducer setup in a through-transmission mode. The embodiment illustrated in FIG. 2 is very similar to that of FIG. 1 except for omission of the delay lines 22, 24 of FIG. 1. The top transducer assembly 37 and the bottom transducer assembly 38 comprise an ultrasonic transducer 12, 14 and a thin membrane dry couplant 34, 36 without any delay lines. The disclosed apparatus provides great flexibility in non-destructively testing a wide variety of specimens, and without contaminating the specimen with couplant.

Figure 3:
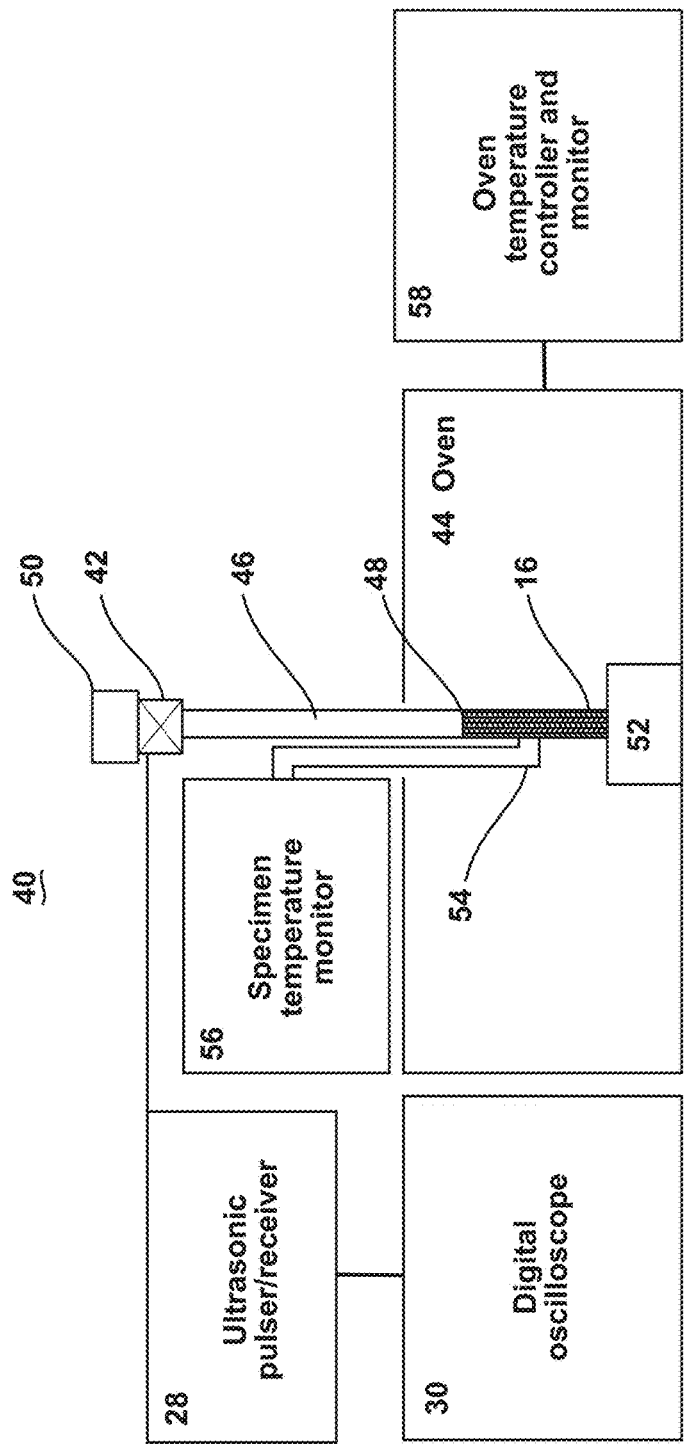
FIG. 3 illustrates a apparatus for performing nondestructive evaluation of a specimen with ultrasound transducers in dry-contact with the specimen in an oven, according to the invention.

A variation of this setup may be employed when the specimen is to be measured in a high temperature environment, e.g. an oven. In such a situation, as illustrated in FIG. 3, the pair of transducers (of FIGS. 1-2) may be replaced by a single transducer assembly 42. Other than using only one delay line 46, it can be placed inside an oven 44 for measurements at elevated temperatures. Also, FIG. 3 illustrates a dial indicator 50 sitting at the top of a transducer 42 to monitor the dimensional changes in the delay line for in-situ density assessments at elevated temperatures. When a single transducer 42 is used, the ultrasonic pulser/receiver 28 may operate in pulse-echo mode instead the through-transmission mode (pitch-catch mode) as used in the previous two-transducer arrangement of FIG. 2. In this setup of FIG. 3, a specimen 16 may be placed inside a heating device 44 (e.g. Applied Test System ATS 3210 furnace/oven). Optional high temperature couplant 48 may be applied between the delay line 46 and a specimen 16 to enhance the signal, but is not required. Accordingly, in this embodiment a portion of the delay line 46 is inside the heating device 44.

As illustrated in the embodiment of FIG. 3, on the top of the delay line 46 is attached to the transducer assembly 42. A dial indicator 50 may be placed on the top of the transducer assembly 42 to monitor any dimensional changes in the specimen 16 and or the delay line 46. The specimen 16 and a spacing block 52 are depicted inside the oven 44. A thermocouple 54 provides temperature information to the specimen temperature monitor 56 located outside of the heating device 44. The temperature of the heating device 44 may be controlled and monitored by an oven temperature and controller and monitor 58. The spacing block 52 may be employed to position of the specimen 16 as close to the center of the heating device 44 as is practicable to keep the temperature more uniform for the specimen 16. As depicted in FIG. 3, a single ultrasonic pulser/receiver 28 drives the single ultrasonic transducer 42, and the waveforms are displayed on the digital oscilloscope 30.

Dimensional changes may be detected and displayed by the dial indicator 50. The dimensional changes may be due mainly from the specimen 16 and partially from the delay line 46 in response to temperature changes. The contribution of the delay line 46 to the total dimensional change may be determined by repeating the same experiment using a low temperature expansion material (quartz) in lieu of the specimen 16. The net change of dimension may be used to evaluate the density of the specimen 16 being tested and, accordingly, the velocity and modulus of the specimen 16 at elevated temperatures.

In a typical test procedure, calibration of the apparatus 40 may be needed to be conducted before any specimens can be evaluated. This is different from a traditional ultrasonic velocity measurement arrangement where signals of multiple reflections within a specimen are clearly defined, or multiple specimens of different dimensions of identical compositions are available. The ultrasonic signal of interest according to the disclosed apparatus and method is the first or the fastest ultrasound signal, which may be followed by several further signals due to reverberation of ultrasound in the specimen. One problem with reverberation is that those multiple reflections are often not clearly defined. It was found to be useful to calculate the initial starting time position of ultrasonic signal, as explained below.

Figure 4:
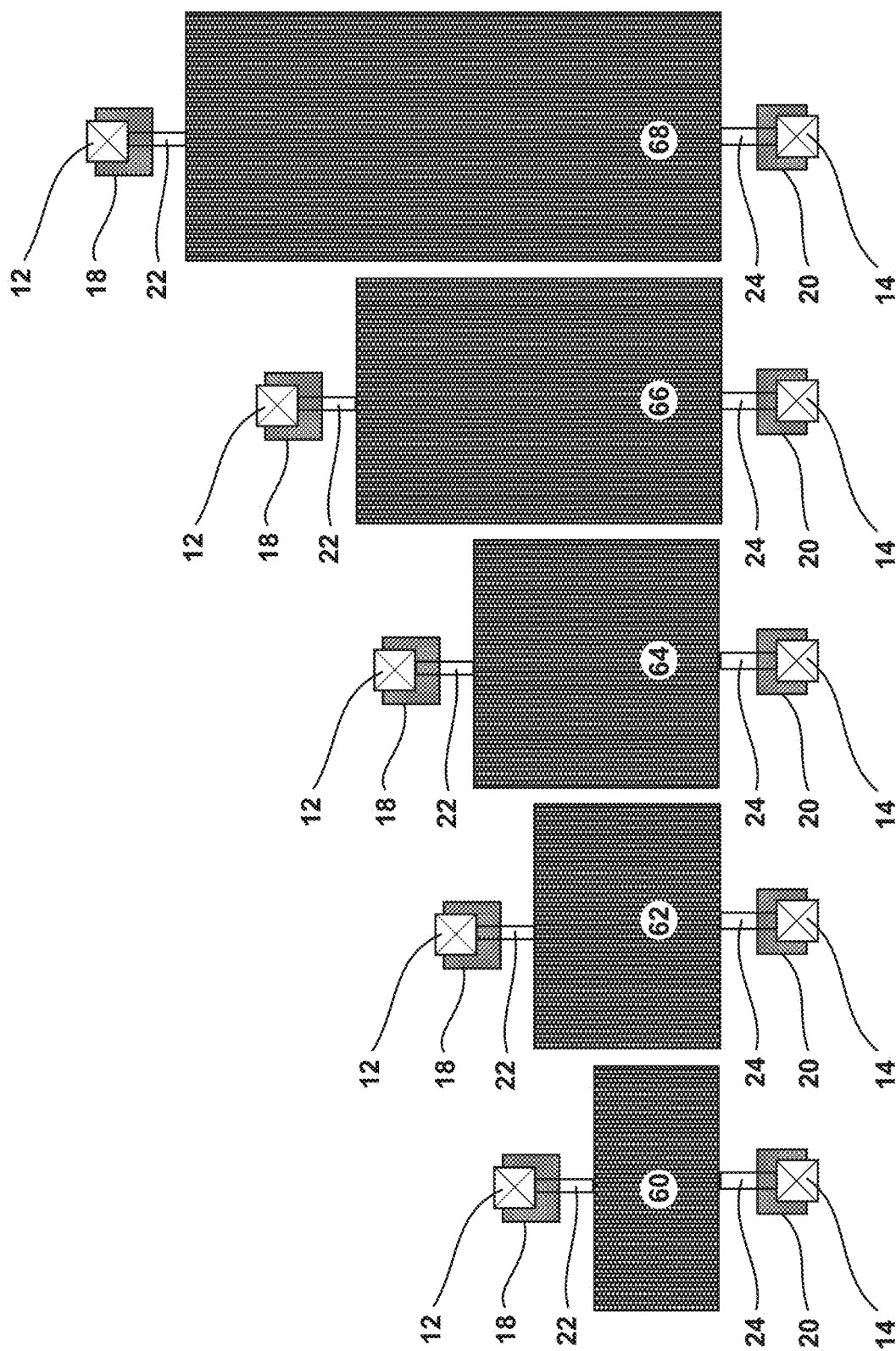
FIG. 4 depicts a calibration arrangement for the invention.
Figure 5:
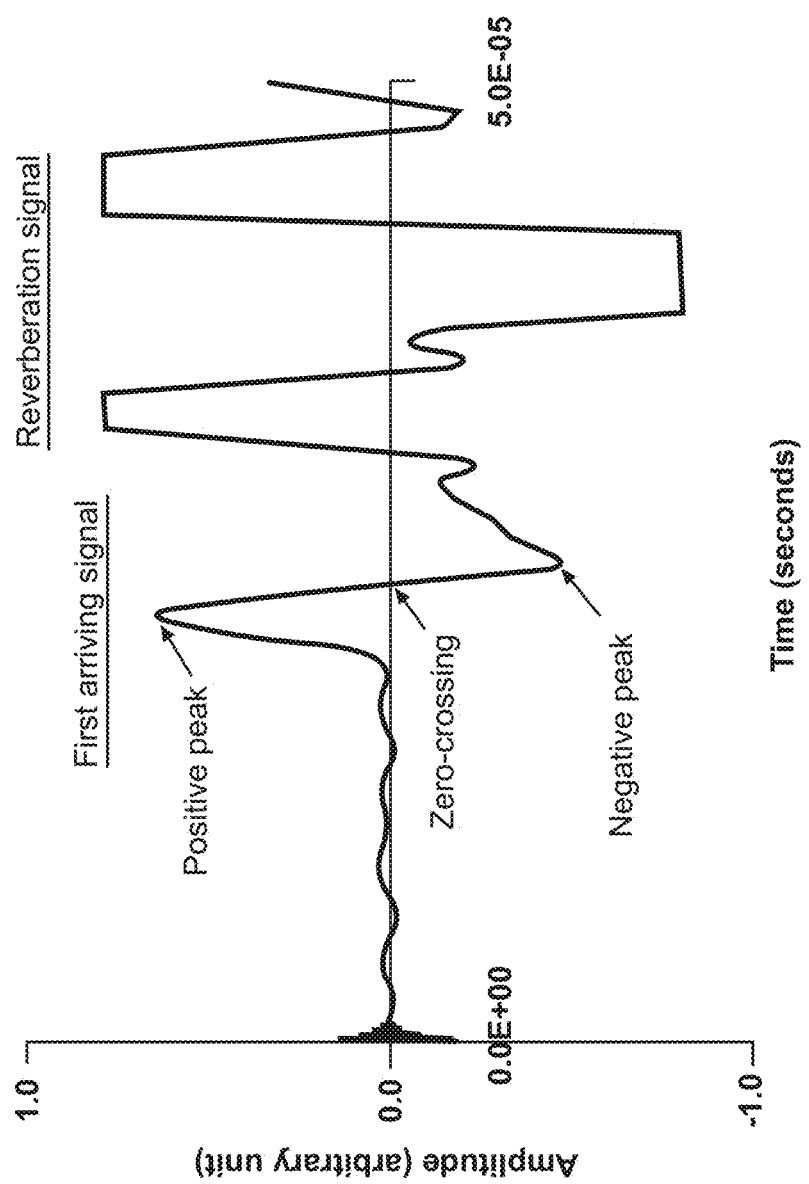
FIG. 5 illustrates the determination of time of flight of an ultrasonic waveform, according to the invention.

FIG. 4 depicts calibration for a representative setup (e.g. FIG. 1). Calibration may be needed at the beginning of the test. Calibration starts with ultrasonic measurements of a series of thin plates 60, 62, 64, 66, 68 (e.g. 1 mm thick Al 2024-T3 and 60 mm wide) of different known lengths (e.g. 30, 45, 60, 90, 130 mm), such as is depicted in FIG. 4. The ultrasonic signal of interest according to the present invention is the first or the fastest signal, which may be followed by several more signals due to the reverberation of ultrasound in the plate, as explained above, and as illustrated in FIG. 5.

Figure 6:
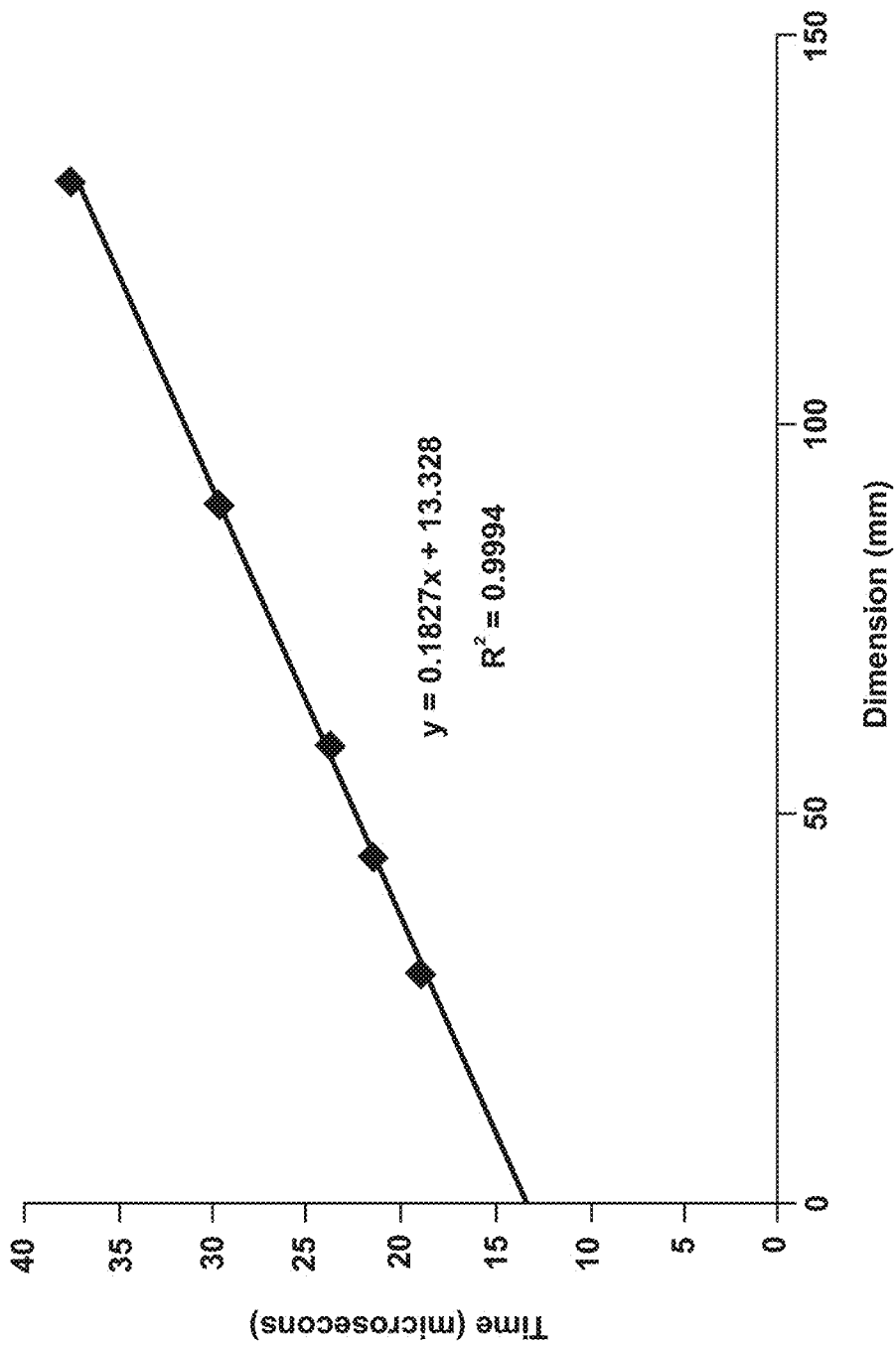
FIG. 6 illustrates the relationship between calibration dimensions and time of flight of an ultrasound waveform, according to the invention.

In each of the first-arriving signals (see FIG. 5), the arrival time at the zero-crossing prior to a peak is recorded. After finding the fastest-arriving signals (i.e., the earliest peak in a waveform), the zero-crossing next to a peak may be located by observing the switch of sign in amplitude (from negative to positive or positive to negative) and recording the arrival time of this position in the waveform. This zero-crossing approach may provide better time definition or time resolution than by using the peak of the signal. This is because when expanded in the time domain, the peak signal is usually spread out into a plateau and does not yield a sharp arrival time as it does at the zero-crossing. After acquiring the waveforms for each of the known-length plates, the arrival time of the zero-crossing before the peak is recorded. A plot of the length is made with the arrival time (see FIG. 6) of the zero-crossing arrival time of the signal. A linear best fit may be made based on the data acquired. The intercept of the best fit line on the time axis may not be at the origin of the plot. This is may be so if the transducer has a wear plate in front of the transducer. A wear plate may delay the initial signal and multiple reflections within the thin plate may smear the initial signal which often called "main bang" signal. The ultrasound signal may be further delayed by the presence of the delay line, making the estimation of the initial starting time difficult. Therefore, in the specimen test as described herein, this intercept may be subtracted out of the zero-crossing from the first arrival signal. By using this intercept method, the time-of-flight in a specimen without multiple specimens or reflections may be estimated. FIG. 6 explains that y=0.1827x+13.328; and $R^2$=0.9994. This is a linear best-fit of the data, which is also known as a linear trendline. The formula shown on FIG. 6 represents a line (i.e., y=mx+b, with m as the slope, and b as the intercept at the y-axis). The intercept is defined as the starting point of the ultrasonic signal from one end of the specimen (i.e., 13.328 microseconds). Therefore, one signal is needed to estimate the time-of-flight or velocity of ultrasound in a specimen. This is a unique approach. Others are using multiple specimens of different lengths or multiple reflections within a single specimen to calculate the velocity. In the present invention, by using this intercept approach, only one signal in one specimen is needed to evaluate the velocity.

Figure 7:
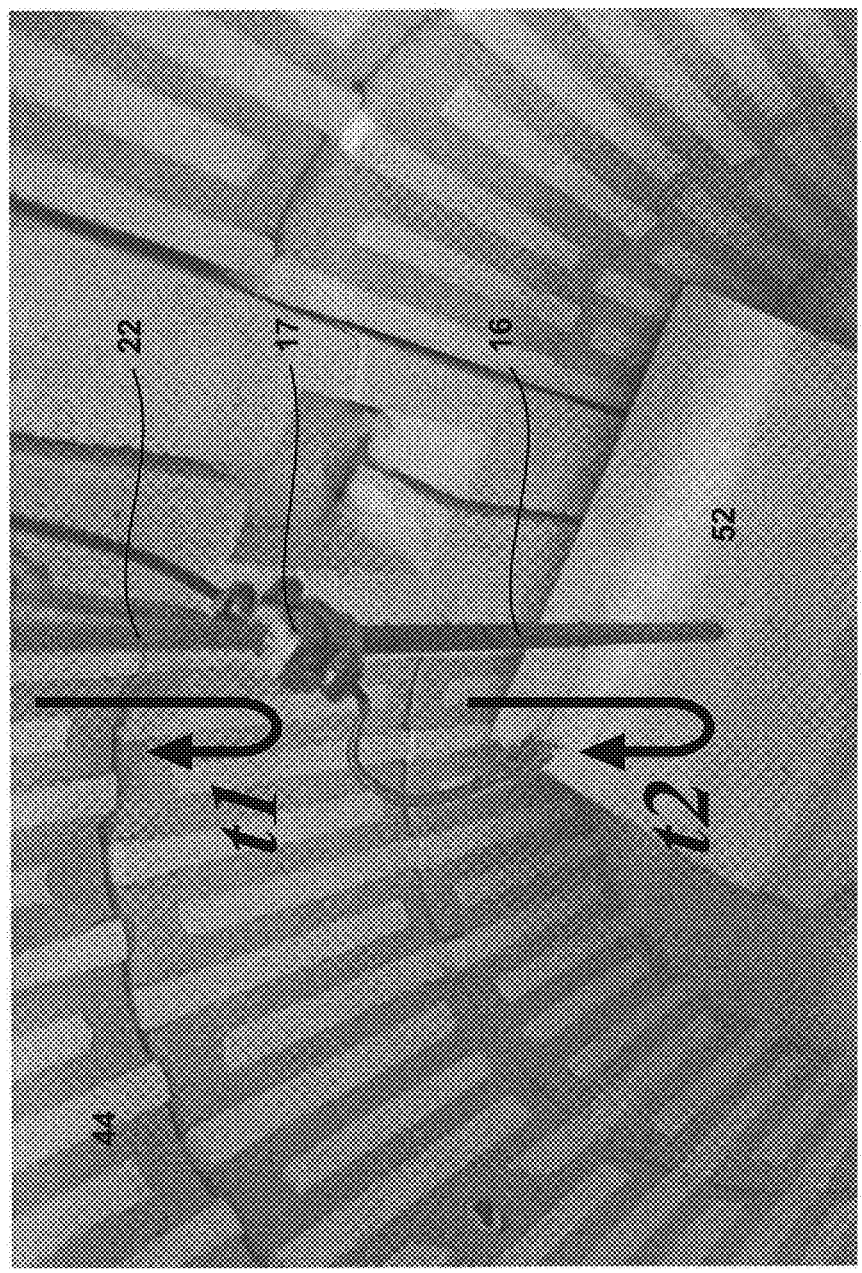
FIG. 7 presents an image of a delay line and specimen arrangement in an oven, according to the invention.
Figure 8:
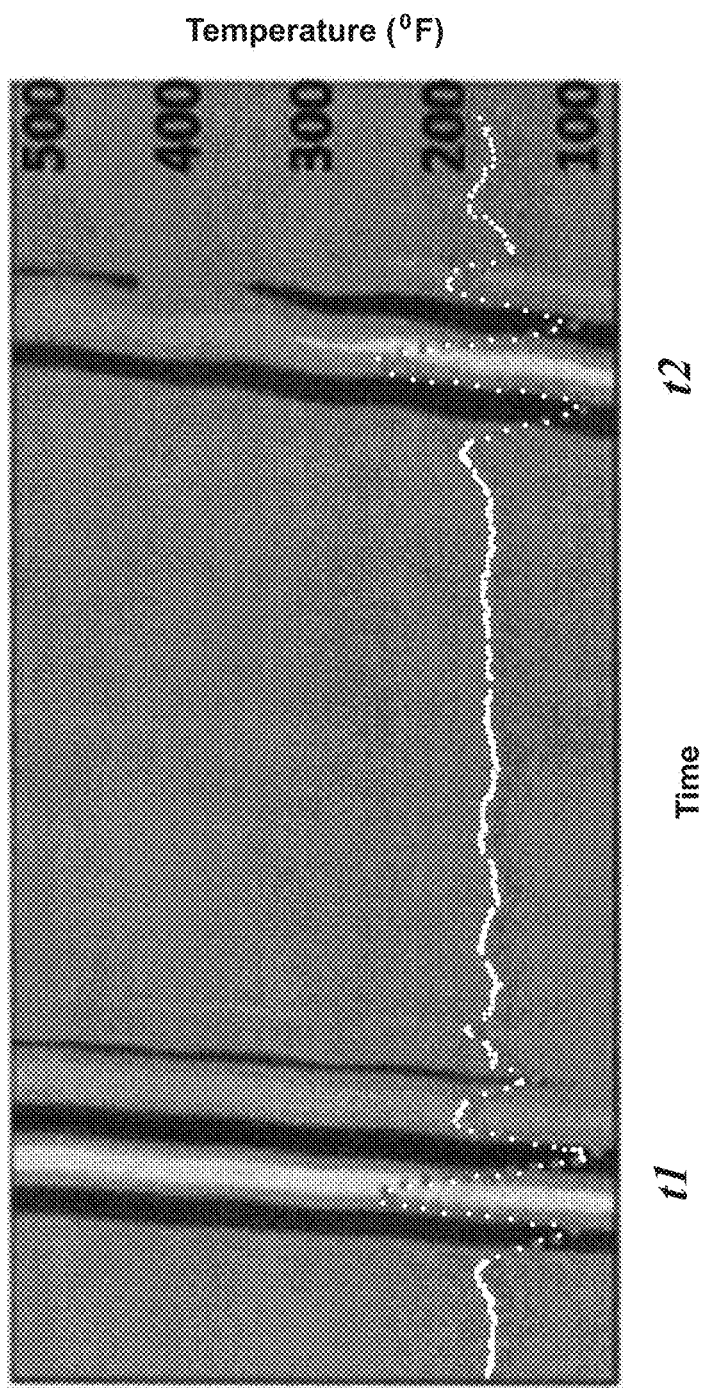
FIG. 8 illustrates variation in ultrasound waveform with temperature, according to the invention.

For the high temperature setup (see FIGS. 3 and 7) having a single transducer, no calibration may be needed since the beginning signal and the ending signal (e.g. waveforms) from a specimen may be well-defined at different temperatures (see FIG. 8). FIG. 8 is a display of hundreds of waveforms taken sequentially (i.e., every 20 seconds) during an entire heating process (i.e., 2.5 hours) in an oven. Therefore, the vertical lines, from bottom up, show the increase of temperature in the oven, as shown on the right side of FIG. 8. This increasing of temperature (i.e., to about 500° F.) corresponds to a point later in the time sequence (about 2.5 hr.) while the data were taken. The horizontal axis also shows the time-of-flight of the signal. The main point of FIG. 8 is that as the temperature increases, ultrasonic signals shifted to the right (i.e., increased time-of-flight). This shows clear evidence that the ultrasonic velocity decreases (i.e., reduced in-plane modulus at elevated temperature), especially when the length of the specimen is affected only slightly by the temperature.

While both FIGS. 3 and 7 illustrate high-temperature setups 40, 70, there are two things in FIG. 7 that are not shown in FIG. 4: (1) a connector 17 and illustration of signal paths (i.e., t1 and t2). The connector 17 is a small coupling fixture with a slightly larger inside diameter than those of the specimen 16 and delay line 22. The purpose of the connector 17 is to keep the delay line 22 in line with the specimen 16, thus allowing maximum transmission of ultrasound to the specimen 16.

The time-of-flight may be estimated instead by taking the difference of the zero-crossing of these two signals. It is noted that the length of the specimen is affected by the temperature within the oven. Since a portion of the delay line, which is attached to the specimen, is in the oven/furnace, a correction scheme may be conducted by making additional measurements at the desired temperatures, with fused quartz in lieu of the specimen, as explained above. Fused quartz has very small known thermal expansion properties and may be used to determine the expansion of the delay line.

The actual length of the specimen at each temperature may be calculated by making a simple arithmetic calculation: (i)-(ii)+(iii): where (i) is a dial indicator reading of specimen with the delay line at temperature, (ii) is dial indicator reading of the fused quartz with the delay line at temperature and (iii) is the length of fused quartz at the defined temperature provided by NIST (National Institute of Standards and Technology). Based on this calibration, the length of the specimen at temperature may be calculated. In addition, the density of the specimen at temperature may be calculated. These values may be used to calculate the in-plane modulus at temperature.

In a typical test procedure, after calibration, the next step is a specimen test. During the specimen test, the same zero-crossing prior to a peak, similar to that in the calibration, should be recorded. The length of the specimen (in the ultrasonic test direction) should be measured, e.g. with a pair of calipers. To prevent a skew or distortion of the ultrasonic signal, the measurement should be conducted in the principal direction of a composite. For example, the direction should be either along the fibers [0°] or across the fibers [90°], but not an intermediate angle such as [45°]. For a [0°/90°] composite, measurement in both orientations may be made. The arrival time of each orientation may be recorded along with the length of each orientation.

In a typical test procedure, the third step is a calculation of the in-plane modulus for the specimen (see the equation below). For an in-plane modulus evaluation, the Poisson's ratio and the density of the material are also needed. The Poisson's ratio may be acquired by a separate test using mechanical means. For a CMC sample with a smaller Poisson's ratio (e.g. 0.2), it was noticed that the effect of the Poisson's ratio may not be significant. For example, an increase of the Poisson's ratio by 100% in the calculation may result in a 4% decrease (or 9 GPa reduction) of in-plane modulus for a typical CMC material. For testing of material in a rod form, the Poisson's ratio term may be taken out from the equation for the calculation of in-plane modulus. Unlike the Poisson's ratio, the density has significant effect on the modulus estimate. A correct density is important for the modulus evaluation. If the modulus of a composite panel is known, this invention may also be used to evaluate the local density variation in the panel.

$$E=\rho V^2(1-v^2)$$

where
$\rho$ density of material
V ultrasonic velocity
E In-plane modulus
v Poisson's ratio The potential applications for this invention are many fold: (a) modeling, (b) material processing, (c) mechanical performance, and (d) raw material screening. Regarding (a), for modeling, the in-plane modulus estimated ultrasonically may provide a critical input parameter needed for FEM (Finite Element Method) modeling. Regarding (b), for material processing, the in-plane modulus estimated ultrasonically may provide important feedback on the degree of infiltration which may be needed to densify a composite material during material processing. Regarding (c), for mechanical performance testing, the in-plane modulus estimated ultrasonically provides the modulus at a temperature for mechanical performance assessment purposes. Regarding (d), for raw material screening, the in-plane modulus estimated ultrasonically may provide information regarding the material states of material received for material processing. For example, the presence of porosity or thermal damage may reduce the values of apparent, i.e. measured by ultrasound, in-plane modulus.

Figure 9:
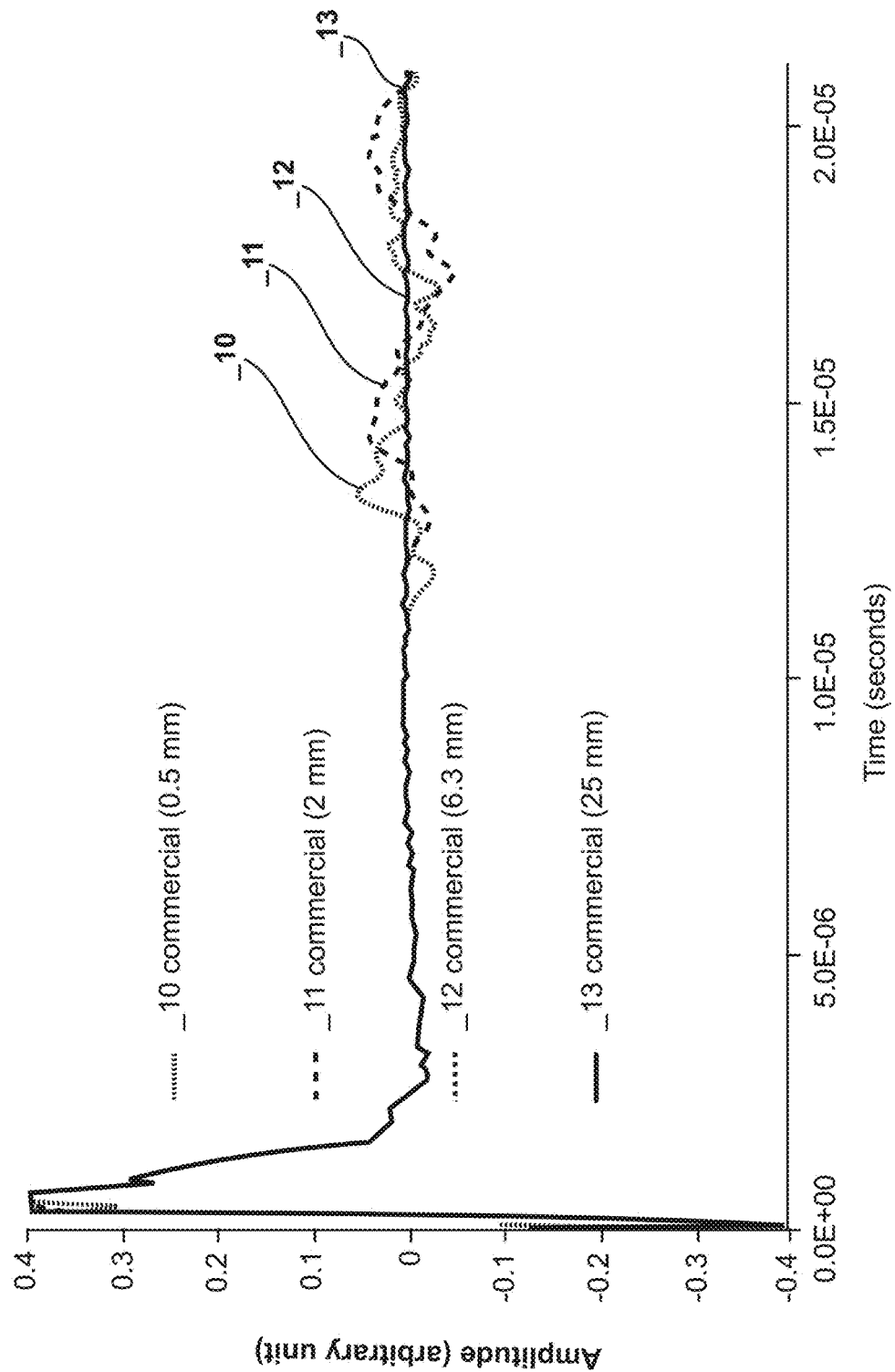
FIG. 9 illustrates ultrasonic signal sensitivity of commercially available NDE membrane materials, according to the invention.
Figure 10:
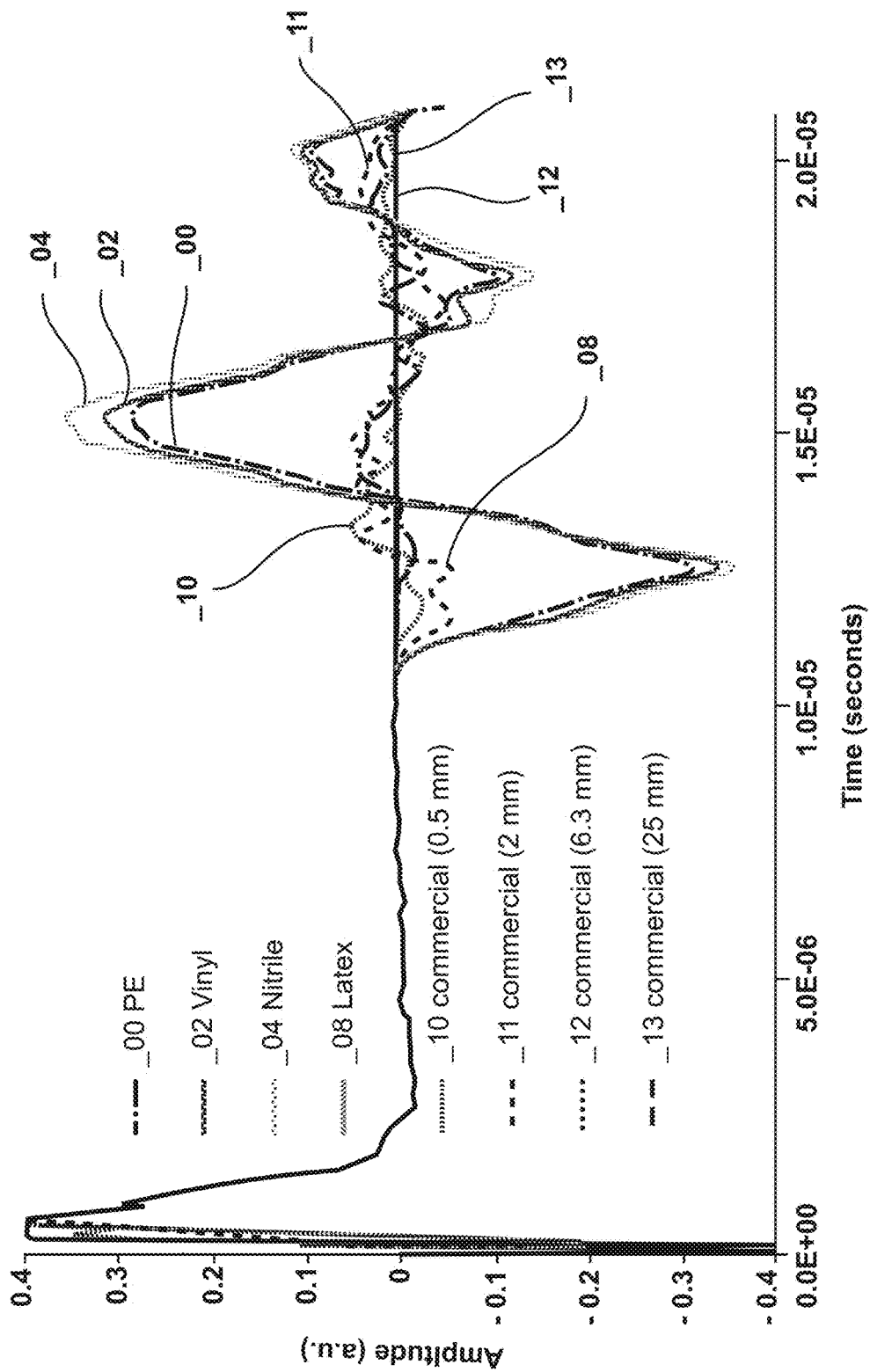
FIG. 10 illustrates ultrasonic signal sensitivity of nitrile, vinyl, and polyester (PE), according to the invention.
Figure 11:
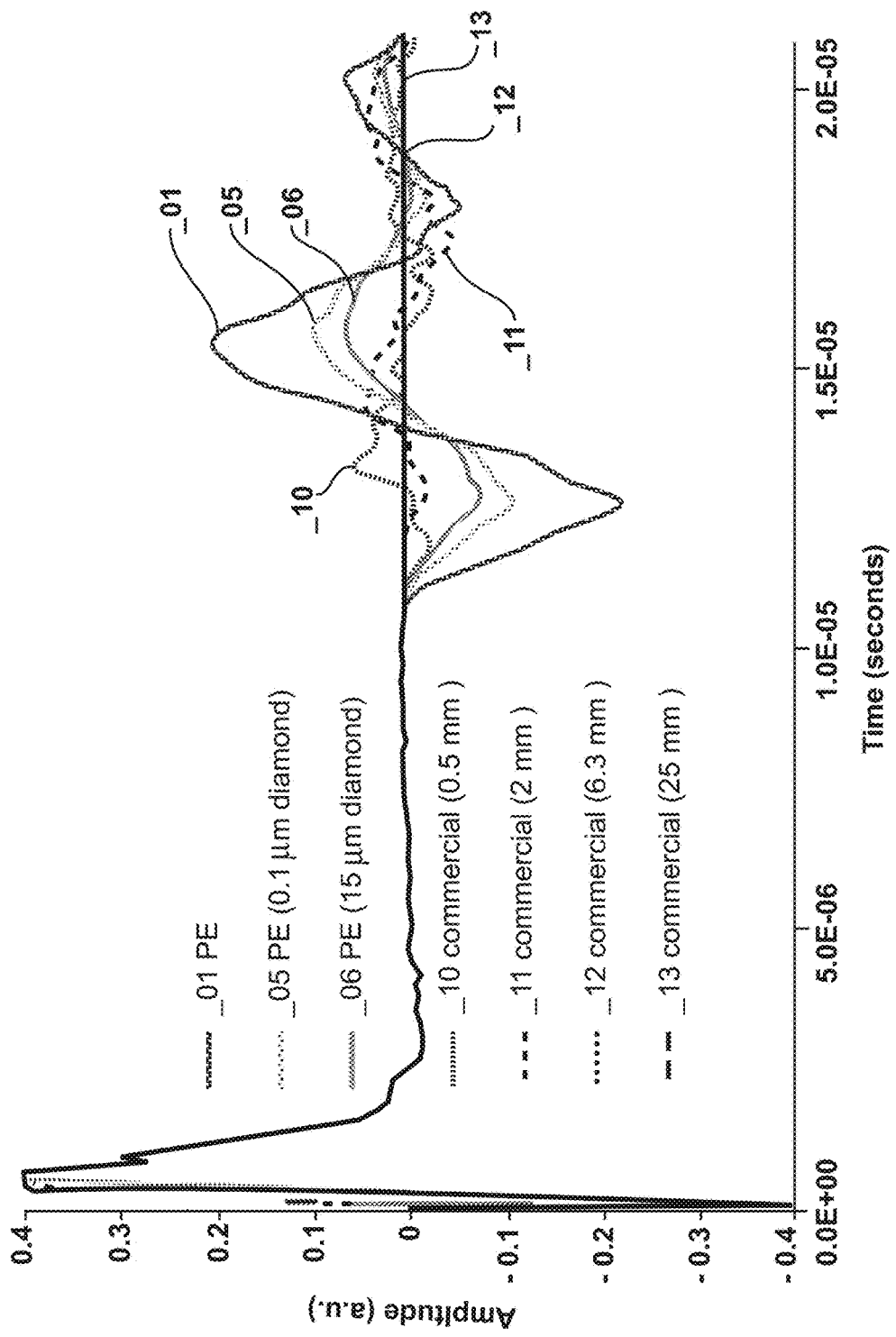
FIG. 11 illustrates ultrasonic signal sensitivity of PE with 0.1 micron diamond particles and PE with 15 micron diamond particles, according to the invention.
Figure 12:
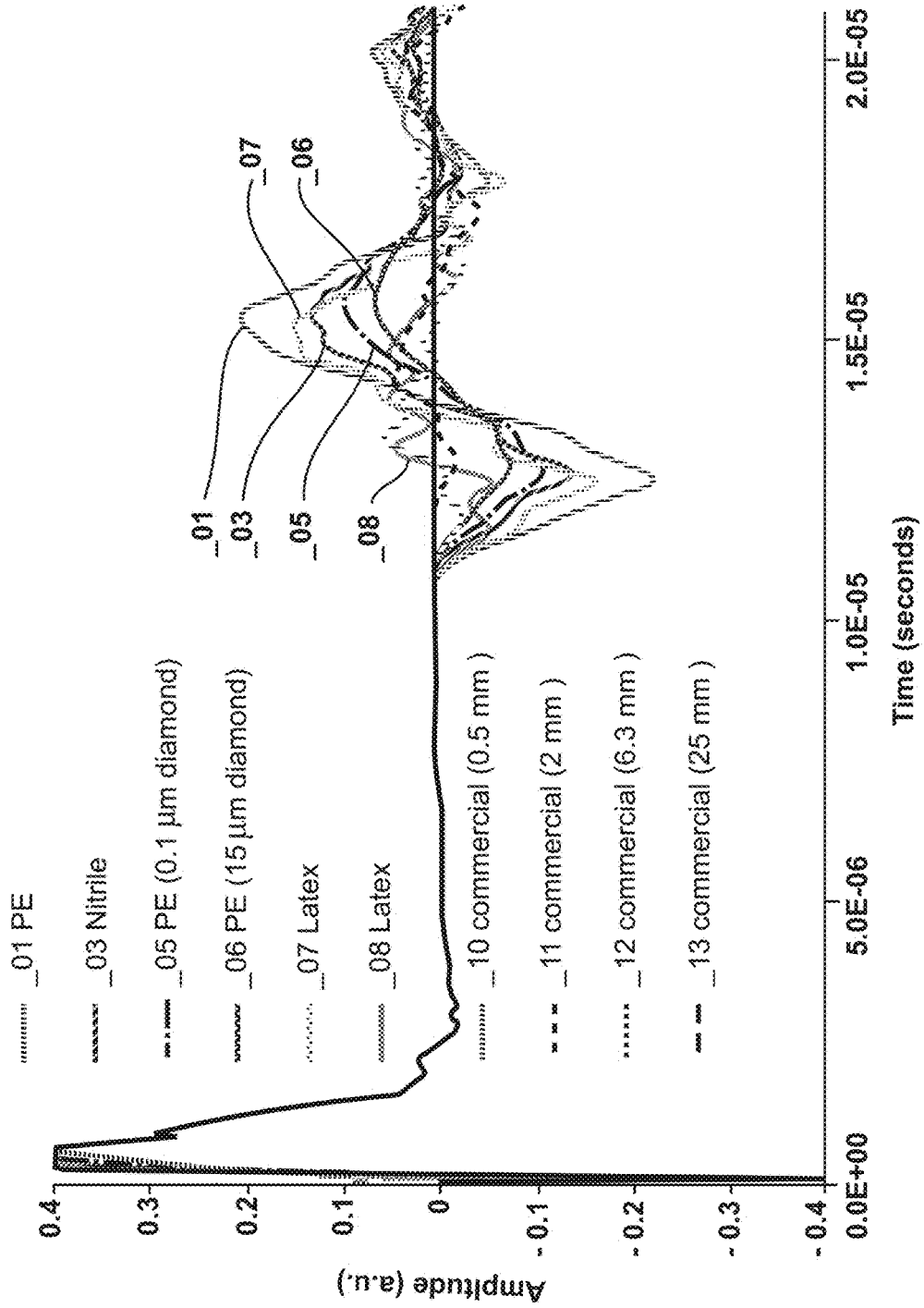
FIG. 12 illustrates ultrasonic signal sensitivity of latex, according to the invention.
Figure 13:
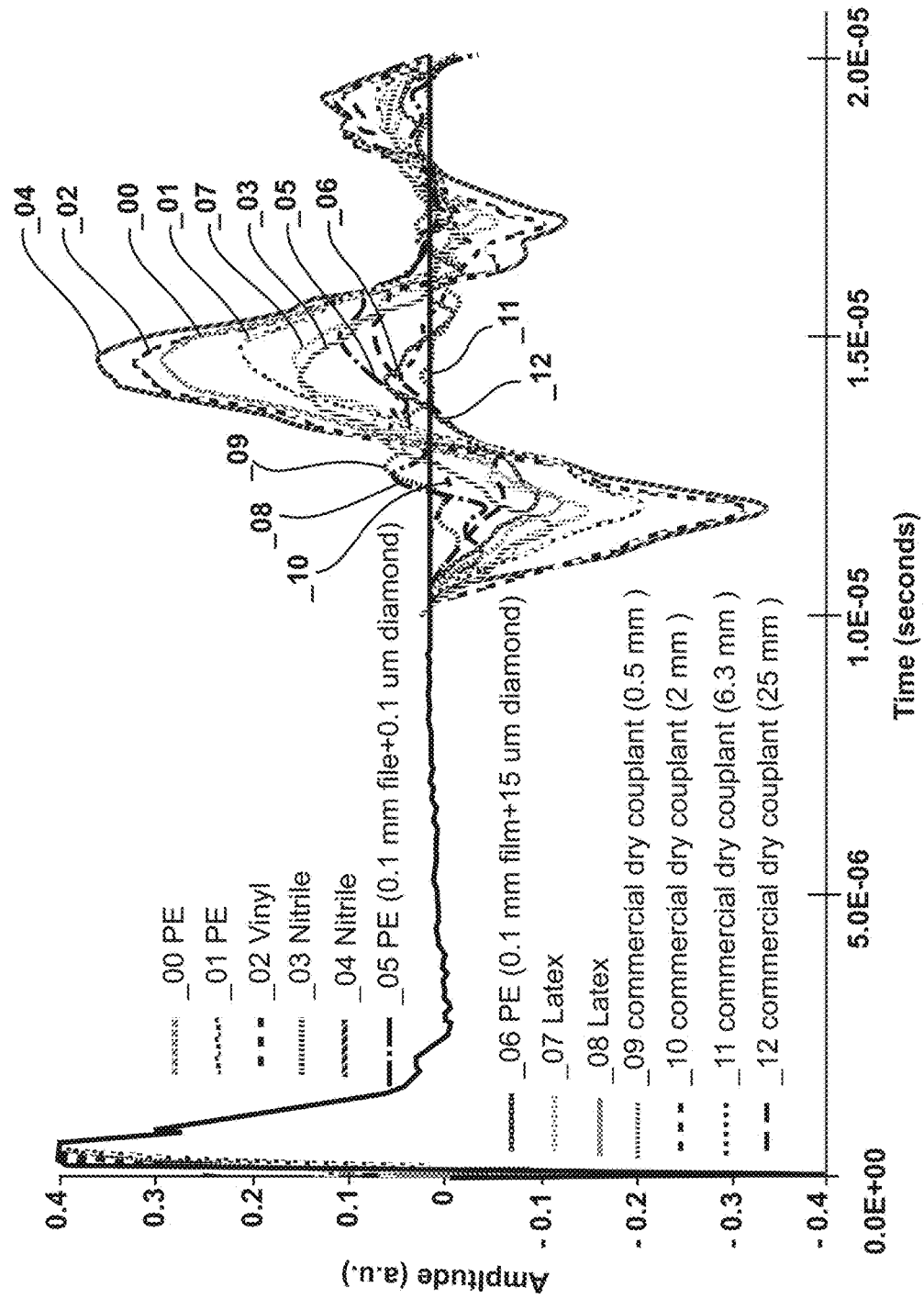
FIG. 13 illustrates ultrasonic signal sensitivity of commercially-available membrane materials, nitrile, vinyl, polyester, polyester with diamond particles, and latex, according to the invention.

FIGS. 9-13 illustrate the effect of particular membrane materials on the ultrasonic signal sensitivity, according to the disclosed invention and method. During the course of invention development, membrane materials with superior ultrasonic signal sensitivity were identified and the effects of their thickness observed. Based on signal sensitivity, four groups were examined (1) commercially available NDE membrane materials obtained from Olympus (FIG. 9); (2) nitrile, vinyl, and polyester (PE) (FIG. 10); (3) PE with 0.1 micron diamond particles and PE with 15 micron diamond particles (FIG. 11); (4) latex (FIG. 12). The signals were observed to decrease as the thickness increased. The results are compiled in FIG. 13, which shows that nitrile, vinyl, and polyester have significantly better sensitivity than commercially available membranes.

As is illustrated in FIG. 9, the commercially-available membranes are not nearly sensitive enough to couple ultrasonic energy into a specimen. The thick commercial dry couplant has an impedance similar to water and has a unique composition. On the other hand (FIGS. 10-12), polyethylene, vinyl, and nitrile membrane materials are optimal or preferable for use according to the present disclosure. In particular polyethylene membranes having a thickness of 0.05 mm to 0.15 mm, or vinyl membranes having a thickness of 0.05 mm to 0.15 mm, or nitrile membranes having a thickness of 0.05 mm to 0.15 mm. Although the thickness of these membranes may have some effect on the transmission of ultrasound therethrough, the material of the membrane also plays a part affecting the transmission of ultrasound through it. This is because the thickness of each of these membranes is relatively small as compared to the ultrasound wavelength (i.e., around 10 mm) through each membrane. For example, latex-type membranes produce much worse signals than do the nitrile-type of membranes. The material properties of the membrane, e.g. the modulus of elasticity and density, play a major role affecting the transmission of ultrasound through the membrane between a transducer and a specimen. In addition, the surface roughness or texture, caused by addition of diamond particles on PE membrane, may also affect the transmission of ultrasound through the membrane.

There are several novel features of the disclosed invention, as described below.

The in-plane modulus of a thin specimen is bale to be determined by a dry contact approach based on the lowest symmetric mode of a low frequency guided wave. An innovative contact approach based on extremely low frequency transducers in a pitch-and-catch mode is presented in this invention to ensure that the modulus measurements stay in the low-frequency asymptote region of the lowest symmetric mode for an in-plane modulus evaluation on a thin specimen. To avoid possible skewness of ultrasound, the measurement may need to be in the principal direction of the material if it is anisotropic. Following these guidelines, the in-plane modulus evaluated has shown excellent agreement when compared with results from independent mechanical testing.

The use of a delay line contact method on the edges of a thin specimen (see FIG. 1, for example) to induce the lowest symmetric mode of a guided wave is a new concept. In ultrasound, whether a specimen is thin or thick depends on its comparison with the ultrasonic wavelength being applied. For most materials tested, the wavelength is around 1 inch (2.54 cm). If the physical thickness is about ⅒ of the wavelength, we can consider it as a thin specimen (i.e., 0.1 inches). This is the upper limit. In theory, there is no lower limit (i.e., the thinner the better). In this invention, a small diameter delay line 22, 24 may be attached to a longitudinal transducer 12, 14 through a delay line fixture 18, 20 for passing low frequency guided waves into a thin specimen 16. Using this setup, guided waves of the lowest symmetric mode are generated in the delay line 22 from a low frequency transducer 12 and directed into the specimen 16. The guided waves then exit the specimen 16 into another delay line 24 attached to another longitudinal transducer 14. To the best of our knowledge, such experimental arrangement or even theoretical study has never been reported in the open literature before. Based on this delay line contact method experimental technique, the generation and reception of the lowest symmetric mode of a guided wave is possible through the edges of a specimen.

The use of a low frequency guided wave method for in-plane modulus evaluation of a thin specimen at high temperature in an oven/furnace environment is also a new concept (see FIG. 3, for example). In this invention, a small diameter delay line 46 is in contact with a transducer 42 outside an oven/furnace 44. Low frequency guided waves are generated in the transducer 42, received in the delay line 46, and passed into a thin specimen 16 inside the oven/furnace 44. Using this setup, guided waves are generated in the delay line 46 from a low frequency transducer 42 before entering a specimen 16, and then the guided waves are returned back to the same delay line 46 attached to the original transducer 42. To the best of our knowledge, such an experimental arrangement has never been reported in the open literature before. Based on this delay line contact method experimental technique, the in-plane modulus of a thin specimen at high temperatures can be evaluated.

The use of a calibration method to locate the starting point in the time domain based on the lowest symmetric mode of a guided wave is also a new concept. This arrangement provides a precise way to identify the starting point in the main bang, i.e. first signal, of a pulse train of ultrasound signals. While multiple modes of guided waves may exit and interact with each other, the only reliable signal may be the earliest signal from the lowest symmetric mode of a guided wave. With only one signal, it may be difficult to determine the velocity needed for a modulus evaluation, although the first signal of the pulse train, in which the starting signal is buried, may serve as a rough estimate of the starting signal. In according with the present invention, a better way to determine the modulus is to use the calibration method described above. This method provides the ability for determining a reliable in-plane modulus estimate. This method is different from the prior art which requires multiple echoes from a specimen, or specimens of different dimensions for a velocity measurement.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus for performing nondestructive evaluation of a specimen comprises:
   a first ultrasonic longitudinal wave transducer configured to be coupled to a first contact point of a specimen to be tested;
   a second ultrasonic longitudinal wave transducer configured to be coupled to a second contact point of the specimen at a predetermined distance from the first contact point, wherein the first ultrasonic longitudinal wave transducer is configured to transmit a guided wave into the specimen, and the second ultrasonic longitudinal wave transducer is configured to receive the guided wave from the first ultrasonic longitudinal wave transducer; and
   a delay line between at least one of the first ultrasonic longitudinal wave transducer and the first contact point and the second ultrasonic longitudinal wave transducer and the second contact point; and
   a dry couplant between the at least one of the first ultrasonic wave transducer and the second ultrasonic wave transducer and the specimen, wherein the first ultrasonic wave transducer and the second ultrasonic wave transducer are low frequency longitudinal transducers that are configured to be operated operating at or below 0.5 MHz (500 kHz).

2. The apparatus for performing nondestructive evaluation of a specimen of claim 1, wherein the dry couplant comprises a membrane between the first and second ultrasonic longitudinal wave transducers and the specimen.

3. The apparatus for performing nondestructive evaluation of a specimen of claim 1, further comprising a dry couplant between at least one of the delay lines and the specimen.

4. The apparatus for performing nondestructive evaluation of a specimen of claim 3, wherein the dry couplant comprises a membrane between the at least one of the delay lines and the specimen.

5. The apparatus for performing nondestructive evaluation of a specimen of claim 3, wherein the dry couplant comprises a membrane between the first and second ultrasonic longitudinal wave transducers and the specimen.

6. The apparatus for performing nondestructive evaluation of a specimen of claim 1, wherein the dry couplant is a nitrile rubber, vinyl, or polyester membrane.

7. The apparatus for performing nondestructive evaluation of a specimen of claim 1, wherein the dry couplant is a nitrile rubber, vinyl, or polyester membrane.

8. The apparatus for performing nondestructive evaluation of a specimen of claim 1, wherein the dry couplant is a nitrile rubber membrane.

9. An apparatus for performing nondestructive evaluation of a specimen comprises:
   a first ultrasonic longitudinal wave transducer configured to be coupled to a first contact point of a specimen to be tested;
   a second ultrasonic longitudinal wave transducer configured to be coupled to a second contact point of the specimen at a predetermined distance from the first contact point,
   wherein the first ultrasonic longitudinal wave transducer is configured to transmit a guided wave into the specimen, and the second ultrasonic longitudinal wave transducer is configured to receive the guided wave from the first ultrasonic longitudinal wave transducer;
   a delay line between at least one of the first ultrasonic longitudinal wave transducer and the first contact point and the second ultrasonic longitudinal wave transducer and the second contact point; and
   a dry couplant between at least one of the first ultrasonic longitudinal wave transducer and the first contact point and the second ultrasonic longitudinal wave transducer and the second contact point, wherein the first ultrasonic wave transducer and the second ultrasonic wave transducer are low frequency longitudinal transducers that are configured to be operated of operating at or below 0.5 MHz (500 kHz).

10. A method for performing nondestructive evaluation of a specimen comprises:
    coupling a first ultrasonic wave transducer to a first contact point of a specimen to be tested;
    coupling a second ultrasonic wave transducer to a second contact point of the specimen at a predetermined distance from the first ultrasonic longitudinal wave transducer;
    transmitting a guided wave from the first ultrasonic wave transducer into the specimen; and
    receiving the wave by the second ultrasonic wave transducer, wherein the first ultrasonic wave transducer is configured to transmit a wave into the specimen, and the second ultrasonic wave transducer is configured to receive the guided wave from the first ultrasonic wave transducer;
    inserting a delay line between at least one of the first ultrasonic wave transducer and the first contact point and the second ultrasonic wave transducer and the second contact point;
    inserting a dry couplant between the at least one delay line and the first and second contact points; and
    operating the first ultrasonic wave transducer and the second ultrasonic wave transducer at or below 0.5 MHz (500 kHz).

11. The method for performing nondestructive evaluation of a specimen of claim 10, further comprising:
    inserting the specimen into an oven, wherein the first ultrasonic wave transducer and the second ultrasonic wave transducer are located outside the oven, and the delay lines couple the first ultrasonic wave transducer and the second ultrasonic wave transducer to the specimen.

* * * * *